United States Patent
Xu (10) Patent No.: US 10,152,650 B2
(45) Date of Patent: Dec. 11, 2018

(54) TRADEMARK RETRIEVAL METHOD, APPARATUS AND SYSTEM, AND COMPUTER STORAGE MEDIUM

(71) Applicant: Qing Xu, Guangdong (CN)

(72) Inventor: Qing Xu, Guangdong (CN)

( * ) Notice: Subject to any disclaimer, the term of this patent is extended or adjusted under 35 U.S.C. 154(b) by 0 days.

(21) Appl. No.: 15/557,449

(22) PCT Filed: Mar. 8, 2016

(86) PCT No.: PCT/CN2016/075870
§ 371 (c)(1),
(2) Date: Sep. 11, 2017

(87) PCT Pub. No.: WO2017/101224
PCT Pub. Date: Jun. 22, 2017

(65) Prior Publication Data
US 2018/0114091 A1    Apr. 26, 2018

(30) Foreign Application Priority Data

Dec. 15, 2015  (CN) .......................... 2015 1 0944503

(51) Int. Cl.
*G06K 9/62* (2006.01)
*G06F 17/30* (2006.01)
(Continued)

(52) U.S. Cl.
CPC ..... *G06K 9/6202* (2013.01); *G06F 17/30256* (2013.01); *G06K 9/36* (2013.01);
(Continued)

(58) Field of Classification Search
USPC .................. 1/1; 382/103, 149, 190; 704/10; 705/7.13
See application file for complete search history.

(56) References Cited

U.S. PATENT DOCUMENTS 8,644,606 B2 * 2/2014 White ............... G06K 9/00684
382/149
8,676,623 B2 * 3/2014 Gale ...................... G01C 21/20
705/7.13
(Continued)

FOREIGN PATENT DOCUMENTS

CN       1581159        2/2005
CN    101727580 A       6/2010
(Continued)

OTHER PUBLICATIONS

International Search Report for international application No. PCT/CN2016/075870, dated Sep. 22, 2016 (4 pages, including English translation).
(Continued)

*Primary Examiner* — Xuemei Chen
(74) *Attorney, Agent, or Firm* — Hamre, Schumann, Mueller & Larson, P.C.

(57) ABSTRACT

A trademark retrieval method, comprising: establishing a sample trademark library and establishing a correlation between sample trademarks and division data for figurative element codes of known pending or registered figurative trademarks; extracting and processing image feature information about the sample trademarks, and establishing a correlation between the sample trademarks and the extracted image feature information; extracting image feature information about a trademark to be retrieved; carrying out matching retrieval by taking the image feature information as a retrieval condition, and finding out a sample trademark reaching a pre-determined similarity degree, and a sample trademark with the highest similarity degree and a corresponding figurative element code; acquiring and confirming a figurative element code of the trademark to be retrieved; taking the figurative element code as a retrieval condition to carry out matching retrieval, and finding out a matching (Continued)

sample trademark; collecting a result retrieved by taking the image feature information as the retrieval condition and a result retrieved by taking the figurative element code as the retrieval condition; and sequencing the collected trademarks according to the similarity degree of the image feature information. By means of the present disclosure, the standardized retrieval of figurative trademarks can be realized.

10 Claims, 6 Drawing Sheets

(51) Int. Cl.
  *G06K 9/46*   (2006.01)
  *G06K 9/54*   (2006.01)
  *G06K 19/14*   (2006.01)
  *G06Q 50/18*   (2012.01)
  *G06K 9/36*   (2006.01)
  *G06K 9/48*   (2006.01)

(52) U.S. Cl.
  CPC ............ *G06K 9/4609* (2013.01); *G06K 9/48* (2013.01); *G06K 9/54* (2013.01); *G06K 9/6215* (2013.01); *G06K 19/14* (2013.01); *G06Q 50/184* (2013.01); *G06K 2209/25* (2013.01)

(56) References Cited

U.S. PATENT DOCUMENTS

| | | | | |
|---|---|---|---|---|
| 9,508,151 | B2* | 11/2016 | Romanik | G06T 7/73 |
| 9,594,957 | B2* | 3/2017 | Tanaka | G06F 17/30781 |
| 9,740,963 | B2* | 8/2017 | Sawhney | G06K 9/6255 |
| 10,002,459 | B2* | 6/2018 | Tokumoto | G06T 15/503 |
| 2012/0093401 | A1* | 4/2012 | Tsunematsu | G06T 9/20 |
| | | | | 382/165 |
| 2013/0077870 | A1 | 3/2013 | Froeba et al. | |
| 2014/0126775 | A1* | 5/2014 | Kakino | G06K 9/00 |
| | | | | 382/103 |
| 2014/0153831 | A1* | 6/2014 | Ishiyama | G06K 9/78 |
| | | | | 382/190 |
| 2015/0234808 | A1* | 8/2015 | Miyata | G06F 17/2735 |
| | | | | 704/10 |
| 2015/0288853 | A1* | 10/2015 | Yamazaki | H04N 1/40 |
| | | | | 358/474 |
| 2016/0042253 | A1* | 2/2016 | Sawhney | G06K 9/6255 |
| | | | | 382/190 |
| 2016/0055398 | A1* | 2/2016 | Ishiyama | G06K 9/00577 |
| | | | | 382/190 |
| 2016/0217158 | A1* | 7/2016 | Watanabe | G06F 17/30268 |
| 2017/0287147 | A1* | 10/2017 | Takahashi | G06T 7/35 |

FOREIGN PATENT DOCUMENTS

| | | |
|---|---|---|
| CN | 101739397 A | 6/2010 |
| CN | 101817001 A | 9/2010 |
| CN | 102541954 | 7/2012 |
| CN | 102622420 | 8/2012 |
| CN | 103258037 A | 8/2013 |
| CN | 103914827 A | 7/2014 |
| CN | 104156413 A | 11/2014 |
| CN | 104199931 A | 12/2014 |
| CN | 104462380 A | 3/2015 |
| CN | 104680393 A | 6/2015 |
| CN | 104809142 | 7/2015 |

OTHER PUBLICATIONS

First Office Action and Search Report issued for Chinese Patent Application No. 201510945834A, dated Dec. 23, 2016, 16 pages including English translation.

Second Office Action issued for Chinese Patent Application No. 201510945834A, dated Mar. 20, 2017, 12 pages including English translation.

First Office Action and Search Report issued for Chinese Patent Application No. 201510937686.1, dated Apr. 21, 2017, 12 pages including English translation.

Second Office Action issued for Chinese Patent Application No. 201510937686.1, dated Jul. 27, 2017, 11 pages including English translation.

First Office Action and Search Report issued for Chinese Patent Application No. 201510944503.9, dated Jan. 11, 2017, 9 pages including English translation.

Song, Rui-Xia et al., "Trademark Retrieval Algorithm Based on Combination of Boundary and Region Features," Journal of Software, vol. 23, Supplement (2), Dec. 2012 (Publication Date listed in Chinese Office Action and/or Search Report is Oct. 22, 2012), pp. 85-93. (English abstract; Cited in Chinese Office Action and/or Search Report dated Dec. 23, 2016).

\* cited by examiner

TRADEMARK RETRIEVAL METHOD, APPARATUS AND SYSTEM, AND COMPUTER STORAGE MEDIUM

FIELD

The present disclosure relates to the field of trademark information retrieval, and more particularly, to a method, a device and a system for trademark retrieval, and a computer storage medium.

BACKGROUND

Trademark retrieval is important for applications for trademark registration, trademark examinations, trademark managements, trademark right protections and other procedures. The main purpose of the trademark retrieval is to retrieve a same or similar trademark in the sense of trademark laws to determine the information on the scope of rights of a certain trademark. The predecessor of the World Intellectual Property Organization—the United International Bureau for the Protection of Intellectual Property and International Coordinating Committee founded an Expert Committee to study and draft the international classification of figurative elements of trademarks in 1967. The classification of figurative elements of trademarks was firstly introduced in an agreement signed at the Vienna Diplomatic Conference on Jun. 12, 1973. *The International Classification of Figurative Elements of Marks* established by the Vienna Convention has been widely used by various countries. This classification is generally considered to be scientific, convenient and easy to operate in the trademark industry, and is an indispensable tool for retrieving figurative trademarks, dividing trademark figurative elements correctly and performing computer-based retrieval for trademark figurative elements for trademark examiners and administrators, trademark searchers, trademark attorneys and trademark applicants.

On one hand, traditional trademark retrieval tools generally perform trademark retrieval by retrieving characters such as Chinese characters, English characters and other languages' characters of a name of a trademark, figurative element code, and items of an application for trademark registration, in response to user input. The traditional trademark retrieval tools generally retrieve figurative element trademarks by manually inputting trademark figurative element codes as the retrieval condition to realise the purpose of retrieval. However, although the traditional trademark figurative retrieval tools may perform retrieval tasks based on trademark information, there are obvious shortcomings and drawbacks, including: high specialization in the coding of the trademark figurative elements that the widespread application of the figurative trademark retrieval is influenced since the ordinary people are not skilled at or even do not know coding. Even for professional coders, they have difference in determining the meaning of the figurative trademark, and such difference may cause a same or similar trademark to be missed. The coding of the trademark figurative elements in the trademark retrieval is substantially based on manual input and subjective judgment, without intelligent means. In addition to the restriction caused by the high specialization, the traditional trademark retrieval tools may lead to low efficiency and enormous amount of labor because there may be generally thousands of entries in a retrieved result matching the input figurative element code, which are required to be checked manually one by one by the staffs to determine if any belongs to a same or similar trademark in the sense of the trademark laws.

On the other hand, with the progress and development of image recognition technologies, the image recognition technologies have been introduced into the field of trademark retrieval to form some methods for trademark retrieval based on image recognition technology, in order to improve the intellectualization of the figurative trademark retrieval. However, although the existing methods for trademark retrieval based on image recognition technology may perform retrieval tasks for trademark information in theory, there are still many shortcomings and drawbacks. For example, the existing methods for trademark retrieval based on image recognition technology do not comply with the international retrieval standard for the coding of the trademark figurative elements, and the trademark retrieval not according to the international standard for the coding of the trademark figurative elements is difficult to retrieve the same or similar trademark under current standard rules of trademark examination, so the existing methods for trademark retrieval based on image recognition technology have not been recognized by the trademark offices and trademark service industries, which are easy to cause the same or similar trademark to be missed, with poor practicability. Therefore, the existing methods for trademark retrieval based on image recognition technology are rarely applied in practice in trademark offices, trademark agencies, trademark services, enterprise trademark management departments, and other professional fields.

SUMMARY

Based on the above, an objective of the present disclosure is to provide a method, a device and a system for trademark retrieval, and a computer storage medium, to combine the figurative trademark retrieval method based on the international standard for the coding of the trademark figurative elements and the figurative trademark retrieval method based on image recognition technology to fully reflect features of the trademark, so as to achieve a standardized retrieval for the figurative trademark.

According to one aspect of the present disclosure, a method for trademark retrieval is provided, including: S101, establishing a sample trademark library and establishing a correlation between sample trademarks and division data for figurative element codes of known pending or registered figurative trademarks; S102, extracting and processing image feature information about the sample trademarks, and establishing a correlation between the sample trademarks and the extracted image feature information; S103, extracting and processing image feature information about a trademark to be retrieved; S104, taking the image feature information about the trademark to be retrieved as a retrieval condition to carry out matching retrieval, and finding out a sample trademark matching the image feature information about the trademark to be retrieved and reaching a predetermined similarity degree, a sample trademark with a highest similarity degree to the image feature information about the trademark to be retrieved, and a corresponding figurative element code; S105, acquiring and confirming a figurative element code of the trademark to be retrieved; S106, taking the confirmed figurative element code as a retrieval condition to carry out matching retrieval, and finding out a sample trademark matching the confirmed figurative element code; S107, collecting a result retrieved by taking the image feature information about the trademark to be retrieved as the retrieval condition and a result retrieved by taking the confirmed figurative element code as the retrieval condition; and S108, sequencing collected trademarks according to the similarity degree of the image feature information and reporting a trademark search result.

According to another aspect of the present disclosure, a device for trademark retrieval is provided, including: a sample trademark library establishing module configured to establish a sample trademark library, and establish a correlation between sample trademarks and division data for figurative element codes of known pending or registered figurative trademarks; a sample trademark image feature information extraction module configured to extract and process image feature information about the sample trademarks, and establish a correlation between the sample trademarks and the extracted image feature information; a trademark to be retrieved image feature information extraction module configured to extract and process image feature information about a trademark to be retrieved; a first matching retrieval module configured to take the image feature information about the trademark to be retrieved as a retrieval condition to carry out matching retrieval, and find out a sample trademark matching the image feature information about the trademark to be retrieved and reaching a pre-determined similarity degree, a sample trademark with a highest similarity degree to the image feature information about the trademark to be retrieved, and a corresponding figurative element code of the trademark; a figurative element code confirmation module configured to acquire and confirm a figurative element code of the trademark to be retrieved; a second matching retrieval module configured to take the confirmed figurative element code as a retrieval condition to carry out matching retrieval, and find out a sample trademark matching the confirmed figurative element code; a collection module configured to collect a result retrieved by taking the image feature information about the trademark to be retrieved as the retrieval condition and a result retrieved by taking the confirmed figurative element code as the retrieval condition; and a sequencing module configured to sequence collected trademarks according to the similarity degree of the image feature information and report a trademark search result.

According to a further aspect of the present disclosure, a system for trademark retrieval is provided, including a memory and a server, wherein the memory and the server are configured to perform the following operations: establishing a sample trademark library and establishing a correlation between sample trademarks and division data for figurative element codes of known pending or registered figurative trademarks; extracting and processing image feature information about the sample trademarks, and establishing a correlation between the sample trademarks and the extracted image feature information; extracting and processing image feature information about a trademark to be retrieved; taking the image feature information about the trademark to be retrieved as a retrieval condition to carry out matching retrieval, and finding out a sample trademark matching the image feature information about the trademark to be retrieved and reaching a pre-determined similarity degree, a sample trademark with a highest similarity degree to the image feature information about the trademark to be retrieved, and a corresponding figurative element code; acquiring and confirming a figurative element code of the trademark to be retrieved; taking the confirmed figurative element code as a retrieval condition to carry out matching retrieval, and finding out a sample trademark matching the confirmed figurative element code; collecting a result retrieved by taking the image feature information about the trademark to be retrieved as the retrieval condition and a result retrieved by taking the confirmed figurative element code as the retrieval condition; and sequencing collected trademarks according to the similarity degree of the image feature information and reporting a trademark search result.

According to a still further aspect of the present disclosure, a storage medium containing a computer readable program is provided. When the computer readable program is executed in the storage medium, the above method for trademark retrieval will be performed.

The method for trademark retrieval according to an embodiment of the present disclosure combines the figurative trademark retrieval method based on the international standard for the coding of the trademark figurative elements and the figurative trademark retrieval method based on image recognition technology, to exhibit the two retrieval methods' advantages and offset their weaknesses. The combination of the two retrieval methods can more fully reflect features of the trademark to achieve a standardized retrieval for the figurative trademark. In this way, the retrieval accuracy rate and the reliability of the same or similar trademark are improved effectively, the technical defects and limitations in the existing methods for trademark retrieval based on image recognition technology not according to the international standard for the coding of the trademark figurative elements have been overcome. The embodiment of the present disclosure can use the big data resources divided by the figurative element codes of known pending or registered figurative trademarks, and the system can learn and divide the trademark figurative element codes automatically, to achieve the standardized identification of the division of the trademark element codes and address the problems that there is difference between subjective divisions made by different professionals. The method of sequencing the figurative trademarks according to the similarity degree provided by an embodiment of the present disclosure fills in the gaps that there is no effective sequencing according to the similarity degree in the method for retrieving figurative trademarks by using the trademark figurative element codes. By sequencing collected trademarks according to the similarity degree, the staff who is responsible for trademark figurative retrieval can find out the target trademark without reviewing the whole retrieved result, or can review the retrieved result according to the rule of the sequencing to quickly find out the target trademark. In this way, the practicability and the operability of the trademark retrieval tool can be effectively strengthened, the retrieval accuracy rate and the reliability of the same or similar trademarks and the convenience in reviewing the retrieved result can be improved. The present disclosure can effectively address the problems of low efficiency and enormous amount of working time and labor in the exiting trademark retrieval tools, thus improving working efficiency, saving more reviewing time and effort, and having high application value.

DETAILED EMBODIMENTS

The technical solution of the present disclosure will be described in detail below by reference to the following embodiments taken in conjunction with the accompanying drawings.

Figure 1:
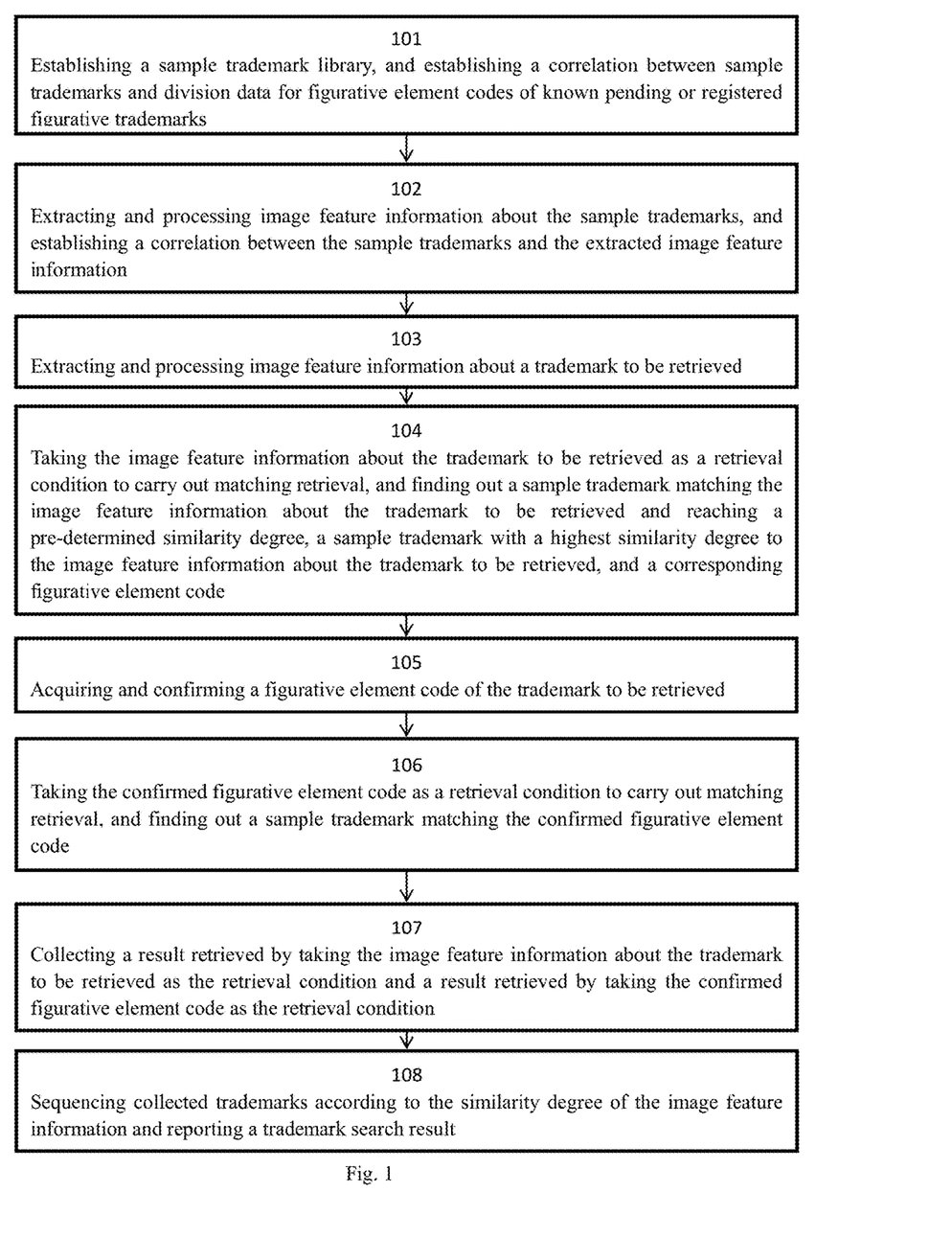
FIG. 1 is a flow diagram illustrating a method for trademark retrieval according to an embodiment of the present disclosure.

FIG. 1 is a flow diagram illustrating a method for trademark retrieval according to an embodiment of the present disclosure, the method including the following steps:

S101, establishing a sample trademark library and establishing a correlation between sample trademarks and division data for figurative element codes of known pending or registered figurative trademarks;

S102, extracting and processing image feature information about the sample trademarks, and establishing a correlation between the sample trademarks and the extracted image feature information;

S103, extracting and processing image feature information about a trademark to be retrieved;

S104, taking the image feature information about the trademark to be retrieved as a retrieval condition to carry out matching retrieval, and finding out a sample trademark matching the image feature information about the trademark to be retrieved and reaching a pre-determined similarity degree, a sample trademark with a highest similarity degree to the image feature information about the trademark to be retrieved, and a corresponding figurative element code;

S105, acquiring and confirming a figurative element code of the trademark to be retrieved;

S106, taking the confirmed figurative element code as a retrieval condition to carry out matching retrieval, and finding out a sample trademark matching the confirmed figurative element code;

S107, collecting a result retrieved by taking the image feature information about the trademark to be retrieved as the retrieval condition and a result retrieved by taking the confirmed figurative element code as the retrieval condition; and S108, sequencing collected trademarks according to the similarity degree of the image feature information and reporting a trademark search result.

The above steps will be described in detail below.

Firstly, a sample trademark library is established, and a correlation between sample trademarks and division data for figurative element codes of known pending or registered figurative trademarks is established.

Figure 2:
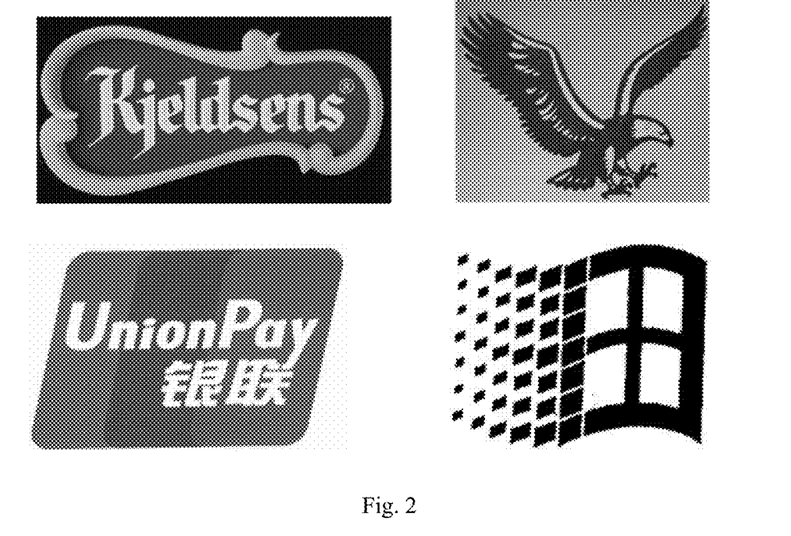
FIG. 2 is a diagram showing some exemplary original images according to an embodiment of the present disclosure.

FIG. 2 shows images of some exemplary sample trademarks randomly provided. In this embodiment, the sample trademark library is established, and the division data for figurative element codes of known pending or registered figurative trademarks is used to record the figurative element coding information of the sample trademark in the sample trademark library.

The trademark figurative element code is a trademark figurative element division tool generated based on the *Vienna Agreement for Establishing an International Classification of the Figurative Elements of Marks*, which is made up by a list of trademark figurative elements in categories, divisions and sections in which the trademark figurative elements are classified, including a trademark figurative element code and a name of the trademark figurative element.

Secondly, the image feature information about the sample trademark is identified and extracted.

The purpose of identifying and extracting the image feature information about the sample trademark is to find out a same or similar trademark by matching the image feature information.

Since an image contour line extracted by a Teh-Chin detection algorithm in the polygon similarity method can satisfactorily reflect the distinctiveness of the trademark, in this technical solution, the Teh-Chin detection algorithm in the polygon similarity method is used to extract feature information about the key pixels of the sample trademark image, i.e., the coordinate values of the pixels in the contour feature line of the sample trademark image.

The feature information about the key pixels of the sample trademark image may also be extracted by other known technical methods, including extracting framework feature information, extracting shape feature information, extracting template feature information and the like.

In this embodiment, the process of identifying the image feature of the sample trademark and extracting the image feature information may include the following steps:

① Performing at least one of preprocessing procedures including graying, binarization and denoising, for each sample trademark;

A gray digital image is an image in which each pixel only has one sample color. This kind of image is generally displayed with a gray level from the darkest black to the brightest white, but in theory, this sampling may be based on any color of different shades, or even based on different colors with different brightnesses. The gray image is different from a black-and-white image. In the field of computer image processing, the black-and-white image only has two colors of white and black. The gray image may include many levels of color depth between black and white.

The image binarization is to set the grey level of the pixels in the image to 0 or 255, so that the whole image presents an obvious black-and-white effect.

The noise mainly refers to a rough portion in the image created in the process of using an optical line as a receiving signal and outputting it by a charge coupled device (CCD), or refers to foreign pixels which should not appear in the image and are generally generated by electronic interference. It seems that the image is tainted, and covered with some fine noise. For a common digital photograph with high-definition taken by a personal computer, if it is shrunk, the noise is easy to be ignored. However, if the original image is enlarged, the color (false color) that is not originally presented will be presented. Such false color is the noise of the image, and the noise can be removed by technical means.

Figure 3:
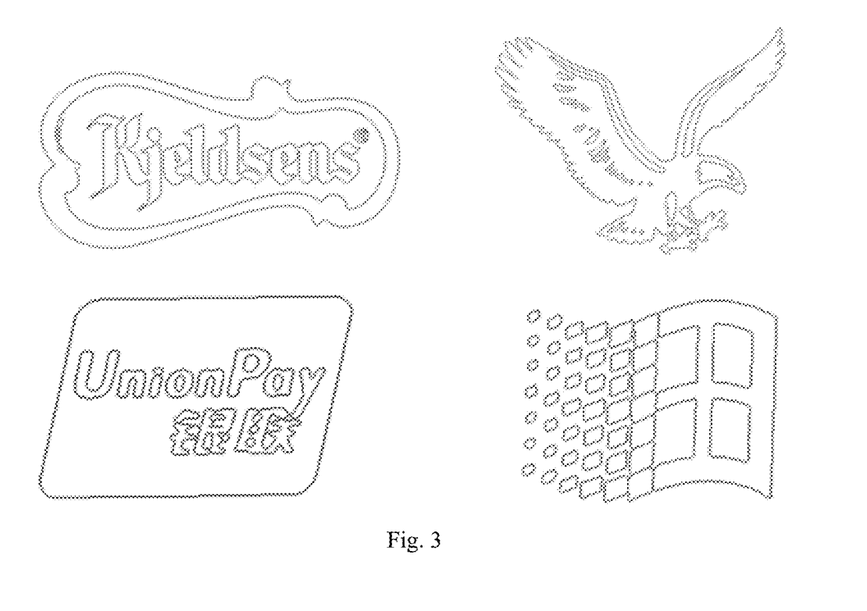
FIG. 3 is a diagram showing some exemplary contour feature lines according to an embodiment of the present disclosure.

② Extracting a contour feature line from the grayed, binarized and denoised image of a sample trademark, wherein the contour feature line includes an external contour line and an inner contour line of the image of the sample trademark;

In this embodiment, the polygon similarity method is used to extract a key pixel feature of the image, that is, the contour feature line. The contour feature line is a set of pixels in a contour line, which can generate a sequential image of pixels in the contour feature line of the image of the sample trademark. FIG. 3 shows contour feature lines of several images. It can be seen that the contour feature line include pixels in the external contour line and pixels in the inner contour line.

The pixels are inherent original features in the image.

③ Positioning a direction and an extracting square or rectangle for the contour feature line in a coordinate system, wherein the coordinate system is constructed so that each pixel of the figure is defined by measurement units in an X axis and a Y axis;

The positioning of the direction and the extracting square or rectangle for the contour feature line refers to positioning the direction and the extracting square or rectangle uniquely for the placement location of the contour feature line by a certain method.

In practical application, the specific purpose of the direction positioning is: in order to achieve the comparability in the direction for pixels in contour feature lines of different images, images of the sample trademarks should be positioned in a unified direction to address the problems of comparability and uniqueness when there is deformation or difference in the direction or orientation of the image. In this way, the coordinate values of the image can be extracted accurately in the coordinate system to achieve the comparability of the coordinate values of same or similar images.

In practical application, the specific purpose of positioning the extracting square or rectangle is: in order to achieve comparability in the extracting square or rectangle for pixels in contour feature lines of different images, images of the sample trademarks should be positioned in an extracting square or rectangle to address the problem of integrity of the image identification range, and further address the problems of comparability and uniqueness when there is deformation or difference in the size, shape and position of the image. In this way, the coordinate values of the image can be extracted accurately in the coordinate system to achieve the comparability of the coordinate values of same or similar images in terms of integrity.

Specifically, in this embodiment, a reference positioning method is used to achieve the above purpose. The reference positioning includes natural reference positioning and reference straight line positioning. Only one positioning standard should be chosen in a same processing system, otherwise the comparability may be destroyed.

Figure 4:
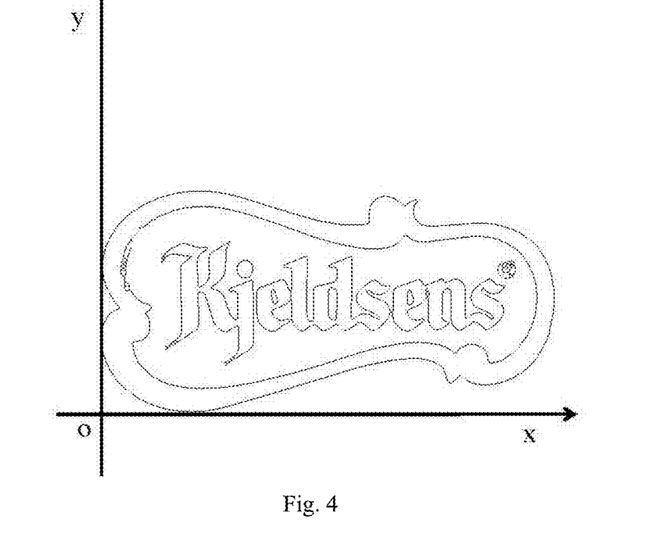
FIG. 4 is a schematic diagram illustrating direction positioning based on a natural reference positioning method according to an embodiment of the present disclosure.
Figure 5:
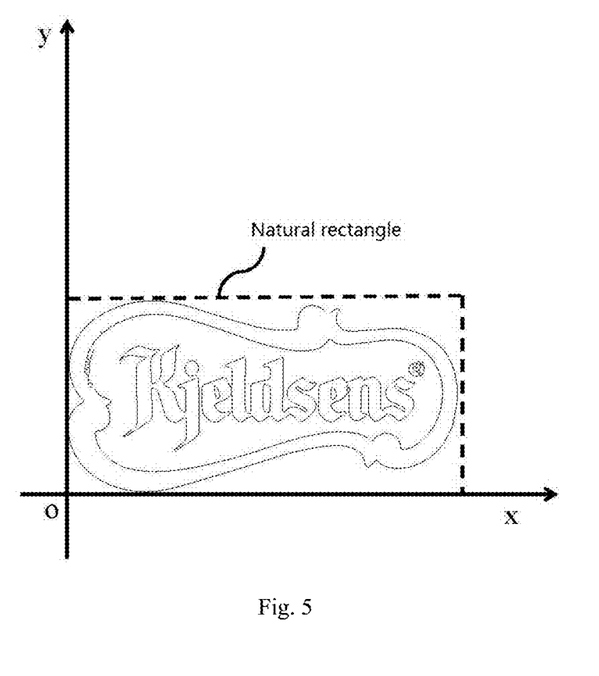
FIG. 5 is a schematic diagram illustrating extracting square or rectangle positioning based on a natural reference positioning method according to an embodiment of the present disclosure.

FIG. 4 illustrates the key points of direction positioning based on a natural reference positioning method. FIG. 5 illustrates the key points of positioning an extracting square or rectangle based on a natural reference positioning method, where the extracting square or rectangle is an external rectangle. With the natural reference positioning method, the contour feature line of the image of the sample trademark may be translated to a coordinate system without changing the rotational direction so that the pixels in the contour feature line of the image of the sample trademark have a minimum value of 0 in both X axis and Y axis. The natural reference positioning method is simple, and is easy for quick positioning.

Figure 6:
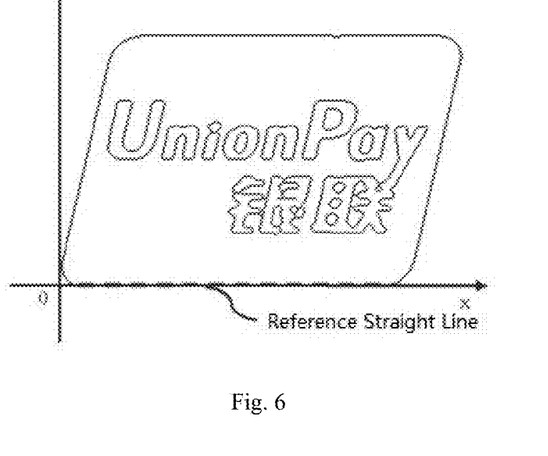
FIG. 6 is a schematic diagram illustrating direction positioning based on a reference straight line positioning method according to one embodiment of the present disclosure.
Figure 7:
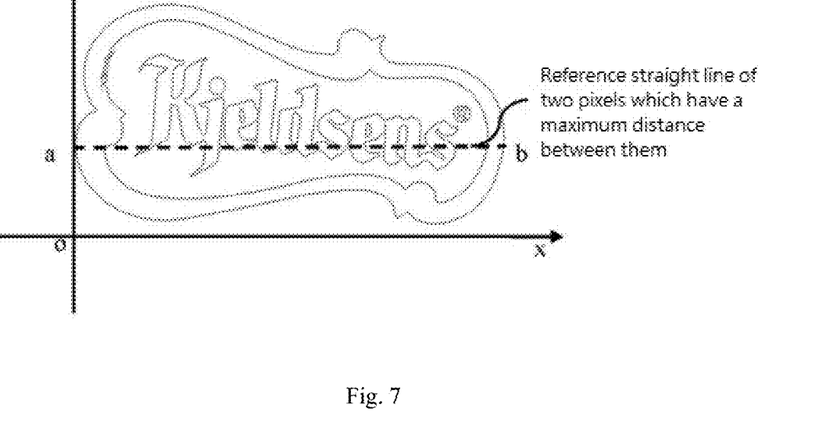
FIG. 7 is a schematic diagram illustrating direction positioning based on a reference straight line positioning method according to another embodiment of the present disclosure.
Figure 8:
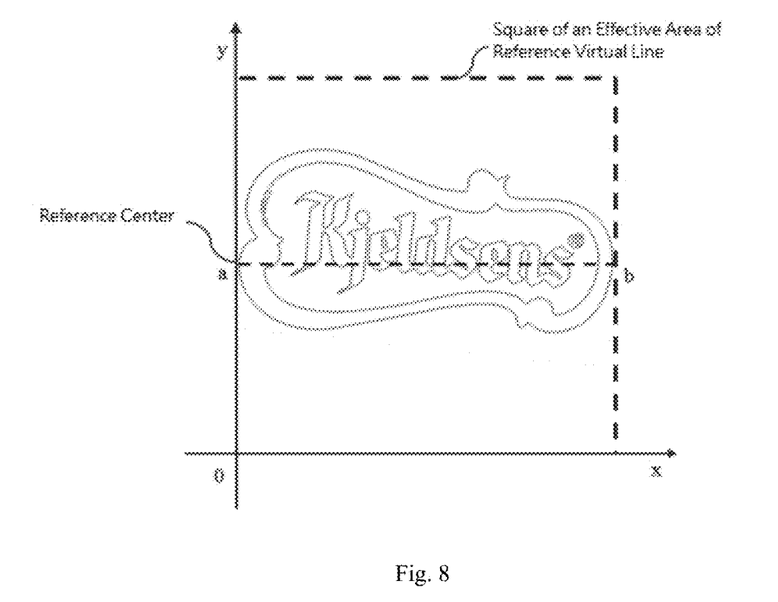
FIG. 8 is a schematic diagram illustrating extracting square or rectangle positioning based on a reference straight line positioning method according to an embodiment of the present disclosure.

FIG. 6 and FIG. 7 illustrate the key points of direction positioning based on a reference straight line positioning method. FIG. 8 illustrates the key points of positioning an extracting square or rectangle based on a reference straight line positioning method, where the extracting rectangle is an external square. With the reference straight line positioning method, a positioning straight line may be found in the contour feature line of the image of the sample trademark, and the contour feature line of the image of the sample trademark may be angularly translated at a smallest rotation degree so that the positioning straight line can be parallel to the X axis or the Y axis (the positioning line is parallel to the X axis in this embodiment), the pixels in the contour feature line of the image of the sample trademark have a minimum value of 0 in the X axis, and the contour feature line of the image of the sample trademark is aligned and centered at the Y axis inside the extracting square or rectangle. The reference straight line positioning method can achieve precise positioning, and can provide a good and unique positioning reference for images placed at different angles or irregular images.

The processes of the reference straight line positioning method are described below:

1. The reference straight line positioning method is used to position the direction. Firstly, the pixels in the contour feature line of the image of the sample trademark are detected to determine whether there is a straight line feature in the arrangement of the pixels. If there is a straight line feature, a longest straight line in the external contour line may be found out, and the contour feature line of the image of the sample trademark may be rotated at a minimum rotational angle so that the longest straight line in the external contour line is parallel to the X axis or the Y axis, that is, it can be determined that the contour feature line is positioned in the direction. FIG. 6 shows an embodiment in which the positioning of the direction is used with the longest straight line in the external contour line.

If there are two or more longest straight lines in the outer contour line during the positioning of the direction, the straight line that can be rotated in a minimum rotational angle to be parallel to the X axis or the Y axis may be chosen as the reference straight line.

It there is no straight line feature in the arrangement of the pixels in the contour feature line of the image of the sample trademark during the positioning of the direction, two pixels which have a maximum distance between them may be detected and calculated in the contour feature line. The contour feature line may be rotated and translated so that a virtual straight line between the two pixels with the maximum distance is parallel to the X axis, and the pixels in the contour feature line of the image have a minimum value of 0 in the X axis. FIG. 7 shows an embodiment where the virtual straight line between the two pixels which have a maximum distance between them is used for the positioning of the direction.

If there are more than two pixels which have a maximum distance between each other in the contour feature line of the image of the sample trademark during the positioning of the direction, the virtual straight line between two pixels with the maximum distance that can be rotated at a minimum rotational angle and the corresponding virtual straight line that is parallel to the X axis or the Y axis may be chosen as the reference straight line for direction positioning.

2. The reference straight line positioning method is used to position the extracting square or rectangle. Firstly, the pixels in the contour feature line of the image of the sample trademark are detected to find out a maximum value in the X axis or the Y axis in the coordinate system. A square may be created with a side of length equal to the maximum value, so that the contour feature line of the image of the sample trademark is aligned to the Y axis and at the center of the square. The square may then be translated so that one side of the square and the X axis overlap, and another side of the square and the Y axis overlap, as shown in FIG. 8.

After the processes of positioning above, there may be comparability for different image feature information, and there may be a common reference standard and a unified comparison environment for different images.

In addition, in other embodiments of the present disclosure, the positioning of the contour feature line of the image of the sample trademark may further be implemented by other policies of positioning. For example, a circumcircle method for the contour feature line of the image of the sample trademark is used so that the circumcircle is tangent to the X axis and the Y axis; other geometrical circumscribed figures for the contour feature line of the image of the sample trademark may also be used so that the geometrical figures are tangent to the X axis and the Y axis.

④ Extracting a coordinate value $G_n(x_n, y_n)$ of a pixel in the contour feature line in the coordinate system.

After positioning the direction and the extracting square or rectangle for the contour feature line of the image of the sample trademark, the coordinate values $G_n(x_n, y_n)$ of all pixels in the contour feature line in the coordinate system may be extracted with a single pixel being a coordinate scale, wherein the subscript n represents a n-th pixel. The extracted pixels include all pixels in the outer contour line and the inner contour line. The total amount of the pixels in the contour feature line may be counted.

It should be noted that the coordinate value $G_n(x_n, y_n)$ of each pixel in the contour feature line of the image of the sample trademark should be extracted based on a same standard for the direction positioning and the extracting square or rectangle positioning, otherwise the comparability will be destroyed.

⑤ Representing the coordinate value $G_n(x_n, y_n)$ with a relative number according to a preset rule to acquire a relative coordinate value $S_n(x_n, y_n)$.

For a plurality of images that are the same visually, owing to the difference in size between different images, it is difficult to ensure the coordinate values of all pixels in the contour line are the same for these images, even after positioning the direction and the extracting square or rectangle of the image. It presents a difficulty in the coordinate matching between the images. To solve this problem, the coordinate value of the pixel in the contour feature line is converts to a relative number to acquire the relative coordinate value of each pixel. In this way, the problem that it is difficult to achieve coordinate matching when there is difference in size between different images can be solved effectively. The coordinate value of the pixel represented by the relative number can be called as a relative coordinate value, and denoted as $S_n(x_n, y_n)$. Specifically, the coordinate value of the pixel in the contour feature line may be converted to a relative coordinate value according to a formula as below:

$$\text{Relative Coordinate Value } S_n(x_n, y_n) = G_n(x_n/h, y_n/h),$$

where $x_n$ is the X-axis coordinate value of the n-th pixel in the coordinate system, $y_n$ is the Y-axis coordinate value of the n-th pixel in the coordinate system, h is the length of the maximum straight side of the extracted square or rectangle, and where values of $x_n$ and $y_n$ in $S_n$ are represented by relative numbers (percentages), and the $x_n$ and $y_n$ in $G_n$ are represented by absolute numbers.

In this embodiment, the coordinate of the relative number is a coordinate converted from the absolute coordinate value with respect to the origin of the coordinates and reflected by a ratio between the absolute coordinate value and the maximum length of the straight side of the extracted square or rectangle of the image.

By representing the pixel feature in the contour feature line with the relative coordinate value, the difference in coordinate values caused by the difference in sizes can be eliminated. Even if there is a great difference between the sizes of two images that are substantially the same, the two images may also be identified.

⑥ Determining a distortion tolerance parameter of the relative coordinate value $S_n(x_n, y_n)$ according to image analysis requirements.

In practical application, it should be noted that the range of the conversion distortion tolerance should be reasonably determined during the conversion of the relative coordinate value. The distortion tolerance means that when the pixel offsets to be within the range of the distortion tolerance parameter in any direction, the relative coordinate value of the pixel stays constant. In this embodiment, the distortion tolerance i of the relative coordinate value $S_n(x_n, y_n)$ should be determined according to image analysis requirements. After the coordinate value $G_n(x_n, y_n)$ of the pixel in the contour feature line is converted to the relative coordinate value $S_n(x_n, y_n)$, the uniqueness of the image of the sample trademark can be distinguished according to the tiny difference between the relative coordinate values, but it might be difficult to find out a matched image when the coordinates are matched. The distortion tolerance can be used to address the problem of coordinate matching of the image in the range of the distortion tolerance. The specific value of the distortion tolerance should be determined according to image analysis requirements. The distortion tolerance parameter is generally a percentage, such as 1%, 2%, etc. In this embodiment, the distortion tolerance parameter i is in the range of 0.5% to 10%.

⑦ Rounding the relative coordinate value $S_n(x_n, y_n)$ according to the distortion tolerance parameter and a rounding rule of "omitting decimal fractions smaller than 0.5 and counting all others, including 0.5, as 1", to acquire a rounded relative coordinate value $Z_n(x_n, y_n)$ that have been precisely rounded by the distortion tolerance.

When the distortion tolerance parameter is 1%, the X-axis and Y-axis coordinates for the relative coordinate value of the pixel should be equally divided into 100 reference relative coordinates. The relative coordinate value which does not fall into the reference relative coordinate should be rounded by the rounding rule in order to fall into the reference coordinate.

The rounding rule in this embodiment is that: the relative coordinate value $S_n(x_n, y_n)$ of the pixel is rounded according to the distortion tolerance parameter and the rounding rule of "omitting decimal fractions smaller than 0.5 and counting all others, including 0.5, as 1" to acquire a rounded relative coordinate value $Z_n(x_n, y_n)$ of the pixel that has been rounded by the distortion tolerance precisely.

The specific processes of rounding will be described with reference to the following embodiment as below.

Embodiment One

Supposing that the acquired relative coordinate values $S_n(x_n, y_n)$ of a set of pixels in a contour feature line of the image of the sample image may include:

$S_1$ (0%, 52.321%), $S_2$ (0.891%, 51.567%), $S_3$ (2.189%, 50.463%), $S_4$ (3.986%, 49.646%), $S_5$ (4.895%, 47.347%), $S_6$ (6.263%, 45.396%), $S_7$ (8.231%, 43.373%), $S_8$ (9.172%, 41.502%), and $S_9$ (11.265%, 38.674%).

If the deformation tolerance parameter i is, for example, 2%, the relative coordinate values are rounded according to the rounding rule of "omitting decimal fractions smaller than 0.5 and counting all others, including 0.5, as 1", the rounded relative coordinate values $Z_n(x_n, y_n)$ that have been rounded by the distortion tolerance precisely may include:

$Z_1$ (0%, 52%), $Z_2$ (0%, 52%), $Z_3$ (2%, 50%), $Z_4$ (4%, 50%), $Z_5$ (4%, 48%), $Z_6$ (6%, 46%), $Z_7$ (8%, 44), $Z_8$ (10%, 42%), and $Z_9$ (12%, 38%).

⑧ Outputting the rounded relative coordinate values $Z_n(x_n, y_n)$ of the pixels that have been rounded precisely, and storing the rounded relative coordinate values in the sample trademark library.

In this embodiment, the rounded relative coordinate values $Z_n(x_n, y_n)$ of the pixels in the contour feature line of the image of the sample trademark may be output after calculation. The rounded relative coordinate values $Z_n(x_n, y_n)$ of all the pixels in the contour feature line of the image of the sample trademark may be output as data, and stored in the sample trademark image library for the identification, matching, comparison, and analysis with the rounded relative coordinate values $Z_n(x_n, y_n)$ of other figurative trademarks to be identified. The similarity between different trademarks may be reflected by the overlapping degree of the rounded relative coordinate values $Z_n(x_n, y_n)$ of the pixels.

⑨ Establishing a subfigure segment of the image of the sample trademark and extracting the image feature information of the subfigure segment.

Firstly, detect a connected domain contour line of a relatively independent portion in the extracted contour lines of the image of the sample trademark, that is, each set of continuous pixels is a connected domain contour line. Then divide the connected domain contour line to form the subfigure segments for the image of the sample trademark. Finally, take the subfigure segment as a processing object, repeat the processes of abovementioned ①-⑧, extract the image feature information of the subfigure segment of the image of the sample trademark, and acquire the relative coordinate values $S_n(x_n, y_n)$ and the rounded relative coordinate values $Z_n(x_n, y_n)$ of the subfigure segment.

The processing process of the subfigure segment of the image of the sample trademark includes the following steps.

1) The rounded relative coordinate values $Z_n(x_n, y_n)$ of the pixels in the contour line of the sample image are sequenced. The rule of sequencing the rounded relative coordinate values $Z_n(x_n, y_n)$ of the pixels is that: a first sequence is in an ascending order of values in the X axis, and a second sequence is in an ascending order of values in the Y axis. A descending order or a mixture of ascending order and descending order may also be used.

2) An array of continuous pixels are calculated and detected, that is, it is detected as to whether there is a feature of continuity in the arrangement of the pixels. The detection method includes: detecting adjacent pixels from a pixel with a value of 0 in the X axis, wherein when a sequenced adjacent pixel has an increased value or a decreased value over one scale value in the X axis or the Y axis, the pixel is regarded as a break point, and a set of pixels in front of the break point is a first array of continuous pixels; further detecting adjacent pixels from a pixel following the break point, wherein when an adjacent pixel has an increased value or a decreased value over one scale value in the X axis or the Y axis, the pixel is regarded as a further break point, and a set of pixels in front of the further break point is divided into a second array of continuous pixels; and repeating the above processes until all pixels in the contour feature line have been detected.

3) Storing each array of continuous pixels as one subfigure segment for the image of the sample trademark.

Some connected domain contour lines may have a figurative element capable of being further divided, or a plurality of connected domain contour lines may be combined to form a relatively independent figurative element. In these cases, the connected domain contour lines may be edited by a data processing operator through the device and the system in this technical solution, and their composition elements may be customized to be divided or combined, that is, the subfigure segment for the image of the sample trademark may be divided correctly.

⑩ Outputting and storing the relative coordinate values $S_n(x_n, y_n)$ and the rounded relative coordinate values $Z_n(x_n, y_n)$ extracted from the subfigure segment for the image of the sample trademark.

The calculated rounded relative coordinate values $Z_n(x_n, y_n)$ of all pixels in the contour line of the image of the subfigure of the sample trademark may be output as data, and stored under a certain trademark record of the sample trademark library. These rounded relative coordinate values $Z_n(x_n, y_n)$ may be used for matching, comparison, and analysis with the rounded relative coordinate values $Z_n(x_n, y_n)$ of figurative trademarks to be retrieved. The similarity between two images may be reflected by the overlapping degree of the rounded relative coordinate values of the pixels.

Thirdly, identifying and processing the image feature of the trademark to be retrieved, and extracting the image feature information.

In this embodiment, with reference to the abovementioned processing process of "identifying and processing the image feature of the sample trademark, and extracting the image feature information", the image feature of the trademark to be retrieved may be identified and processed and the image feature information is extracted with respect to the trademark to be retrieved as an object to be processed, and the image feature information about the main figure and the subfigure segment of the trademark to be retrieved may be extracted respectively.

In this embodiment, the extracted image feature information mainly includes the relative coordinate values $S_n(x_n, y_n)$ and the rounded relative coordinate values $Z_n(x_n, y_n)$ of the pixels in the contour feature line of the image of the trademark to be retrieved. It should be noted that the image feature information includes but is not limited to $S_n(x_n, y_n)$ and $Z_n(x_n, y_n)$. Other image feature information may be obtained by the derivation and transformation of the abovementioned image feature information, which may also be used to represent the information contained in the image per se.

Fourthly, taking the image feature information about the trademark to be retrieved as a retrieval condition to carry out trademark retrieval, and finding out a sample trademark matching the image feature information about the trademark to be retrieved and reaching a certain similarity degree, a sample trademark with a highest similarity degree to the image feature information about the trademark to be retrieved, and a corresponding figurative element code of the trademark (that is, the figurative element code corresponding to the sample trademark recorded in the sample trademark library).

The main purpose of the matching check of the image feature information of the trademark is to find out a trademark with the highest similarity degree and the recorded figurative element code of the image of the trademark.

The form of image feature information about the trademark used in this embodiment includes relative coordinate values $S_n(x_n, y_n)$ and the rounded relative coordinate values $Z_n(x_n, y_n)$ of pixels in the contour feature line of the image of the trademark, to find out the image of the sample trademark with the highest similarity degree by the matching check for the image feature information about the trademark.

In this embodiment, the retrieval content for the trademark retrieval in the sample trademark data library taking the image feature information about the trademark as a retrieval condition may include: 1) matching check for the rounded relative coordinate values $Z_n(x_n, y_n)$; 2) exactly matching check for each subfigure segment of the image of the trademark or each array of continuous pixels; and 3) check for mismatched pixels of the rounded relative coordinate values $Z_n(x_n, y_n)$.

If the rounded relative coordinate values $Z_n(x_n, y_n)$ of pixels in the contour feature line of the image of two trademarks overlap completely, the two trademarks may be regarded as the same or the most similar trademarks. If they overlap incompletely, it means that only part of the pixels in the image contour feature lines overlaps, and the non-overlapping portion may affect the distinct feature of the trademark, so that the two trademarks may not be regarded as the same or the most similar trademarks.

In this embodiment, the similarity degree between images of two trademarks may be evaluated by the similarity rate of the subfigure segment or the array of continuous pixels of the image of the trademark, the overlapping rate of the relative coordinate values of the pixels, and the non-overlapping rate of the relative coordinate values for the pixels. The following calculation formula may be used:

the similarity degree between two images=the similarity rate of the subfigure segment or the array of continuous pixels of the image of the trademark*the weight of the subfigure segment of the image of the trademark+the overlapping rate of the relative coordinate values*the weight of the overlapped relative coordinate values+the non-overlapping rate of the relative coordinate values for the pixels*the weight of the non-overlapped relative coordinate values.

The weight parameters are determined according to image analysis requirements, and the weight is generally in the range of 5% to 60%.

The calculation of each variable in the calculation formula above is described below.

a) The calculation of the similarity rate of the subfigure segment or the array of continuous pixels of the image of the trademark:

The processing step of the calculation of the similarity rate of the subfigure segment or the array of continuous pixels of the image of the trademark may include:

in the first step, matching each array of continuous pixels divided in the image contour line of the trademark to be retrieved to each array of continuous pixels divided in the image contour line of the sample trademark, to find out a matched array; and in the second step, calculating the similarity rate of the array of continuous pixels according to the following formula:

the similarity rate of the subfigure segment or the array of continuous pixels=(a first matched array of continuous pixels+a second matched array of continuous pixels+a third matched array of continuous pixels+ . . . +a $n$-th matched array of continuous pixels)÷the total number of pixels of the relative coordinate values in this image*100%.

b) The calculation of the overlapping rate of the relative coordinate values of the pixels may include:

check the matching between the rounded relative coordinate value $Z_n(x_n, y_n)$ of each pixel in the image contour feature line of the trademark to be retrieved and the rounded relative coordinate value $Z_n(x_n, y_n)$ of each pixel in the image contour feature line of the sample trademark one by one, to calculate the number of the overlapping and matching relative coordinate values, and calculating the overlapping rate according to the following formula:

overlapping rate=(the number of the overlapping rounded relative coordinate values $Z_n(x_n,y_n)$÷the total number of pixels in the image contour feature line of the trademark to be retrieved) *100%.

When the overlapping rate is equal to 100%, it can be confirmed that the two trademarks are the same. When the overlapping rate is less than 100%, it can be confirmed that the trademark to be retrieved has a part of the contour feature line that is the same as that of the sample trademark.

c) The non-overlapping rate of the relative coordinate values of the pixels may be calculated as below.

During the comparison and matching between two trademarks, the relative coordinate values of most pixels in the images of the two trademarks would not overlap. The impact of the rounded relative coordinate values $Z_n(x_n, y_n)$ of the non-overlapping pixels on the similarity degree between the images of the two trademarks should be considered in the process of matching. The evaluation of the non-overlapping rate of the relative coordinate values of the pixels is employed in the embodiment of the present disclosure, which may be calculated according to the following formula:

the number of non-overlapped relative coordinate values of the pixels=the total number of the rounded relative coordinate values $Z_n(x_n,y_n)$ of the pixels in the image contour line of the trademark to be retrieved−the number of the overlapped, rounded relative coordinate values $Z_n(x_n,y_n)$ of the pixels.

Non-overlapping rate=(the number of the non-overlapped relative coordinate values of pixels÷the total number of pixels in the image contour line of the trademark to be retrieved)*100%.

The sample trademark with the highest similarity degree and the recorded trademark figurative element code are found out according to the matching about the image feature information and the evaluation on the similarity degree.

Fifthly, acquiring and confirming the figurative element code of the trademark to be retrieved.

A sample trademark having an image with the highest similarity degree of the image feature information is found out by the matching check of the image feature information of the main figure and the subfigure segment of the trademark to be retrieved with the image feature information of the main figure and the subfigure segment of the sample trademark. Particularly, when the similarity degree reaches 100%, the two trademark images may be confirmed as the same trademarks, and when the similarity degree is close to 100%, the two trademark images may be confirmed as the highly similar trademarks. Therefore, the above found sample trademark with the highest similarity degree and the recorded trademark figurative element code may be regarded as the figurative element code of the trademark to be retrieved and be output for used on the trademark retrieval system according to the embodiments of the present disclosure.

Figure 9:
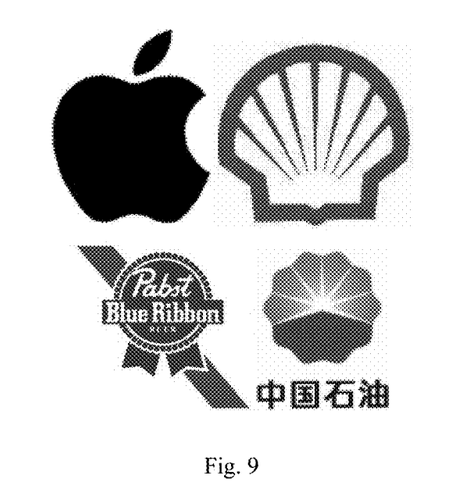
FIG. 9 is a diagram showing some exemplary original images according to another embodiment of the present disclosure.
Figure 10:
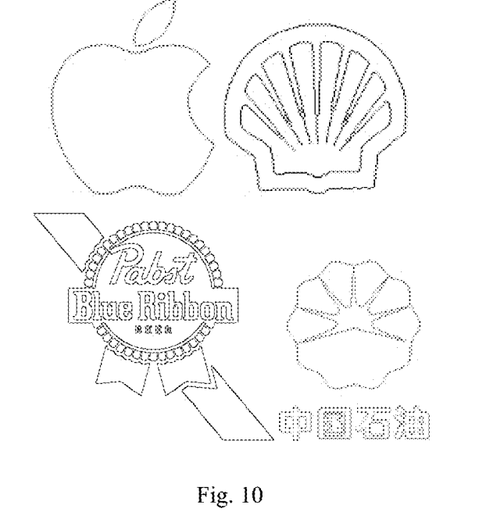
FIG. 10 is a diagram showing some exemplary contour feature lines according to another embodiment of the present disclosure.

To illustrate, exemplary original images of four figurative trademarks of Apple, Shell, Blue Ribbon and China Petroleum are shown in FIG. 9, and FIG. 10. By means of the process mentioned in the examples of the disclosure, the sample trademark with the highest similarity degree may be found in the sample trademark data library, including a figurative trademark NO. 167364, a figurative trademark NO. 180720, a figurative trademark NO. 559294 of Blue Ribbon, and a figurative trademark NO. 4360587 of China Petroleum. The figurative element codes of these four figurative trademarks are listed as below:

the figurative element code of the figurative trademark NO. 167364 of the Apple: 5.7.13;

the figurative element code of the figurative trademark NO. 180720 of the Shell: 3.8.18;

the figurative element code of the figurative trademark NO. 559294 of the Blue Ribbon: 24.5.20; and 25.1.6; and the figurative element code of the figurative trademark NO. 4360587 of the China Petroleum: 1.3.1; 25.1.25; 29.1.13; 5.5.20; and A1.3.15.

Since there are a plurality of retrieval conditions for the main figure and multiple subfigure segments of the trademark to be retrieved, there must be a plurality of figurative element codes to be found out, and in this case, a part of the subfigure segment of the trademark or an image reflected by a certain array of continuous pixels may be not a distinctive portion of the image of the trademark, so the acquired figurative element code of the trademark to be retrieved should be confirmed.

The process of confirmation of the figurative element code is described as below. The trademark searcher may acquire the sample trademark with the highest similarity degree, the recorded figurative element code of the trademark, and the image reflected by the corresponding main figure and the subfigure segment of the trademark or a certain array of continuous pixels, through the device and system according to an embodiment of the present disclosure. The trademark searcher can identify the relevant figurative element code that is capable of reflecting the distinctiveness of the trademark, and the image reflected by the corresponding main figure of the trademark, subfigure segment of the trademark or a certain array of continuous pixels intuitively, simply, conveniently and accurately, and then perform the confirmation operation.

When no figurative element coding information of matching the image reflected by the provided main figure of the trademark, the subfigure segment of the trademark or a certain array of continuous pixels is found in the sample trademark library based on the big data resources divided by the figurative element codes of known pending or registered figurative trademarks, the trademark searcher may customize the information to be recorded or select the information to be recorded according to the International Classification of Figurative Elements of Marks with the device or the system according to the present embodiment, to add a subfigure segment of the trademark to cover the shortage of the division data for the figurative element codes of known pending or registered figurative trademarks.

Sixthly, taking the figurative element code as a retrieval condition to carry out the trademark retrieval, and finding out a sample trademark matching the figurative element code of the trademark.

Using the figurative element code of the trademark for trademark retrieval is a common method used by known trademark retrieval tools. In this embodiment, the figurative element code of the trademark confirmed in the previous step is used for trademark retrieval, so all the same or similar trademarks that may be retrieved by technical methods using traditional trademark retrieval tools can be found accurately and fully. It overcomes the technical defects or limitations in the existing methods for trademark retrieval based on image recognition technology not according to the international standard for the coding of the trademark figurative elements, which are easy to cause the same or similar trademark to be missed, with poor practicability.

Seventhly, collecting a trademark retrieved result of the image feature matching and a trademark retrieved result of the figurative element code matching.

The technical method using the traditional trademark retrieval tool for trademark retrieval has the advantage that: the internationally general standard for the coding of the trademark figurative elements can be used for figurative trademark retrieval, the retrieval standard has generality and standard, and same objects with different shapes or forms can be reflected by the trademark figurative element codes accurately to ensure a high retrieval accuracy rate for the same or similar figurative trademarks. However, different objects with similar shapes or forms are different to be reflected by retrieval of the trademark figurative element codes. Meanwhile, there is difference between the objects reflected by the trademark abstracted images determined by different coders for coding the trademark figurative elements subjectively, so there is difference between the results of coding the trademark figurative elements, and this difference may cause the same or similar trademark to be missed in trademark retrieval.

The trademark retrieval method based on known image recognition technology for trademark retrieval has the advantage that: intelligentized means can be used in the field of trademark retrieval, the efficiency and convenience of trademark retrieval can be improved, and different objects with same or similar shape or form can be retrieved through image recognition. Same objects with different shapes or forms are difficult to be retrieved through image recognition. Meanwhile, the internationally general standard for the coding of the trademark figurative elements is not used in this method for figurative trademark retrieval, so the retrieval standard does not have generality and standard. The retrieval accuracy rate for the same or similar figurative trademarks is generally low, which may cause the same or similar trademark to be missed in trademark retrieval.

The method for trademark retrieval according to the present disclosure combines the figurative trademark retrieval method based on the internationally general standard for the coding of the trademark figurative elements and the figurative trademark retrieval method based on image recognition technology to exhibit the two retrieval methods' advantages and offset their weaknesses.

In order to exhibit the two retrieval methods' advantages and offset their weakness, the trademark retrieved result of the image feature matching and the trademark retrieved result of the figurative element code matching should be collected, that is, the trademarks retrieved by the two retrieval methods should be combined.

Eighthly, sequencing collected trademarks according to the similarity degree and reporting a trademark search result.

There is no effective sequencing function according to the similarity degree in the figurative trademark retrieval based on trademark figurative element code. In this embodiment, a method combining the figurative trademark retrieval method based on trademark figurative element code and the figurative trademark retrieval method based on image recognition technology is used, and the similarity degree of the image feature information in the image recognition technology is used for sequencing.

In this embodiment, the similarity degree of the recorded subfigure segment or the array of continuous pixels of the image of the trademark between the trademark to be retrieved and the sample trademark, the overlapping rate of the relative coordinate values of the pixels, and the non-overlapping rate of the relative coordinate values of the pixels can be used for sequencing.

For Chinese registered trademark search, there may be generally thousands of or even tens of thousands of records in a retrieved result based on a same sample trademark figurative element code and a same class of commodities or services, and there may be tens of thousands of records for same classes of commodities. In these cases, the figurative trademark searcher is required to check each record manually to determine whether the trademark in the retrieved result belongs to a same or similar trademark in the sense of trademark laws, thus leading to obvious results of low working efficiency and enormous amount of time and labor consumption. In this embodiment, by sequencing collected trademarks according to the similarity degree, the figurative trademark searcher can find out the target trademark without reviewing the whole retrieved result, or can review the retrieved result according to the rule of the sequencing to quickly find out the target trademark. In this way, it can effectively address the problem of low working efficiency and enormous amount of labor consumption in the existing trademark retrieval tools.

The trademark retrieved result after sequencing may be reported so that the figurative trademark searcher can review the trademark retrieved result.

The technical solution according to the present disclosure has been described in the above embodiments of trademark retrieval application, but it can be also used in other similar applications.

1. In a retrieval of a design patent application, the above image of the trademark may be modified to or replaced with the image of the design, and the trademark figurative element code may be modified to or replaced with the code in the *International Classification for Industrial Designs*.

2. In an application of same or similar commodity retrieval, the above image of the trademark may be modified to or replaced with the image of the commodity, and the trademark figurative element code may be modified to or replaced with the code of the commodity.

In one embodiment, a device for trademark retrieval is provided, including:

a sample trademark library establishing module configured to establish a sample trademark library, and establish a correlation between sample trademarks and division data for a figurative element code of known pending or registered figurative trademarks;

a sample trademark image feature information extraction module configured to extract and process image feature information about the sample trademarks, and establish a correlation between the sample trademarks and the extracted image feature information;

a trademark to be retrieved image feature information extraction module configured to extract and process image feature information about a trademark to be retrieved;

a first matching retrieval module configured to take the image feature information about the trademark to be retrieved as a retrieval condition to carry out matching retrieval, and find out a sample trademark matching the image feature information about the trademark to be retrieved and reaching a pre-determined similarity degree, a sample trademark with a highest similarity degree to the image feature information about the trademark to be retrieved, and a corresponding figurative element code;

a figurative element code confirmation module configured to acquire and confirm a figurative element code of the trademark to be retrieved;

a second matching retrieval module configured to take the confirmed figurative element code as a retrieval condition to carry out matching retrieval, and find out a sample trademark matching the confirmed figurative element code;

a collection module configured to collect a result retrieved by taking the image feature information about the trademark to be retrieved as the retrieval condition and a result retrieved by taking the confirmed figurative element code as the retrieval condition; and a sequencing module configured to sequence collected trademarks according to the similarity degree of the image feature information and report a trademark search result.

In one exemplary embodiment, the sample trademark library establishing module may include: a figurative element code record sub-module configured to use the figurative element code of known pending or registered figurative trademarks to record figurative element codes of the sample trademarks in the sample trademark library.

The sample trademark image feature information extraction module and the trademark to be retrieved image feature information extraction module may respectively include:

a trademark preprocessing sub-module configured to perform at least one of preprocessing procedures including graying, binarization and denoising, for each trademark;

a contour feature line extraction sub-module configured to extract a contour feature line from an image of the preprocessed trademark, wherein the contour feature line includes a set of edge pixels, a set of external contour line pixels and a set of inner contour line pixels of the image of the preprocessed trademark;

a contour feature line positioning sub-module configured to position the direction and an extracting square or rectangle for the contour feature line in a coordinate system, wherein the coordinate system is constructed so that each pixel of the image is defined by measurement units in an X axis and a Y axis;

a pixel coordinate value extraction sub-module configured to extract a coordinate value $G_n(x_n, y_n)$ of a pixel in the contour feature line in the coordinate system, wherein the subscript n represents a n-th pixel;

a relative coordinate value acquisition sub-module configured to represent the coordinate value $G_n(x_n, y_n)$ with a relative number according to a preset rule, to acquire a relative coordinate value $S_n(x_n, y_n)$, wherein values of $x_n$ and $y_n$ in $S_n$ are represented by relative numbers (percentages), and the $x_n$ and $y_n$ in $G_n$ are represented by absolute numbers;

a relative coordinate value rounding sub-module configured to round the relative coordinate value $S_n(x_n, y_n)$ according to a preset distortion tolerance parameter and a rounding rule of "omitting decimal fractions smaller than 0.5 and counting all others, including 0.5, as 1", to acquire a rounded relative coordinate value $Z_n(x_n, y_n)$;

a coordinate value data output and processing sub-module configured to output and store the acquired relative coordinate value $S_n(x_n, y_n)$ and the rounded relative coordinate value $Z_n(x_n, y_n)$;

a subfigure segment establishing sub-module configured to establish a subfigure segment of the image of the trademark; and an image feature information extraction sub-module configured to extract and processing image feature information of the subfigure segment to acquire a relative coordinate value $S_n(x_n, y_n)$ of the subfigure segment and round the relative coordinate value $S_n(x_n, y_n)$.

In this case, the image feature information may be key feature information of the image of the trademark, including the coordinate value $G_n(x_n, y_n)$ of the pixel in the extracted contour feature line of the image of the trademark after the positioning, the relative coordinate value $S_n(x_n, y_n)$ and the rounded relative coordinate value $Z_n(x_n, y_n)$. On the other hand, the image feature information further includes framework feature information, shape feature information and/or template feature information, extracted by a known figure key feature information extraction device.

In one exemplary embodiment, the first matching retrieval module may include at least one of:

a first retrieval sub-module configured to retrieve the rounded relative coordinate value $Z_n(x_n, y_n)$ in the contour feature line of the image of the trademark;

a second retrieval sub-module configured to retrieve each array of continuous pixels in the contour feature line of the image of the trademark, or information about the subfigure segment of the image of the trademark; and a third retrieval sub-module configured to retrieve unmatched pixels of the rounded relative coordinate value $Z_n(x_n, y_n)$ in the contour feature line of the image of the trademark.

In one exemplary embodiment, the figurative element code confirmation module may include: a figurative element code identification sub-module configured to identify relevant figure element code reflecting distinctiveness of the trademark and an image reflected by a corresponding main figure of the trademark, a corresponding subfigure segment of the image of the trademark, or one array of continuous pixels, from the acquired sample trademark with the highest similarity degree and corresponding trademark figurative element code, and an image reflected by a corresponding main figure of the trademark, a corresponding subfigure segment of the image of the trademark, or one array of continuous pixels, and perform a confirmation operation.

The figurative element code confirmation module may further include: a figurative element code input sub-module configured to add a trademark subfigure segment by user-defined input or input based on contents listed in an International Classification of the Figurative Elements of Marks, when no sample trademark and recorded figure element code information matching the image reflected by the main figure of the trademark, the subfigure segment of the image of the trademark, or one array of continuous pixels is found in the sample trademark library of the division data for the figurative element codes of known pending or registered figurative trademarks.

In one exemplary embodiment, the second matching retrieval module may be further configured to use an image recognition technology to acquire and confirm the figurative element code of the trademark to be retrieved and to carry out matching retrieval.

In one exemplary embodiment, the collection module may include: a combination and collection sub-module configured to combine and collect trademark records retrieved by taking the image feature information about the trademark to be retrieved as the retrieval condition, and trademark records retrieved by taking the confirmed figurative element code as the retrieval condition.

In one exemplary embodiment, the sequencing module may include at least one of:

a first sequencing sub-module configured to sequence collected trademarks according to the similarity degree of the image feature information in an image recognition technology; and a second sequencing sub-module configured to sequence collected trademarks according to an similarity rate of an array of continuous pixels or the subfigure segment of the image of the trademark, an overlapping rate of the relative coordinate value of the pixel and/or non-overlapping rate of the relative coordinate value of the pixel recorded in the trademark to be retrieved and the sample trademark.

According to the abovementioned method and device for trademark retrieval, a system for trademark retrieval is further provided, the system including a memory and a server. The memory and the server are configured to perform the following operations:

establishing a sample trademark library and establishing a correlation between sample trademarks and division data for figurative element codes of known pending or registered figurative trademarks;

extracting and processing image feature information about the sample trademarks, and establishing a correlation between the sample trademarks and the extracted image feature information;

extracting and processing image feature information about a trademark to be retrieved; taking the image feature information about the trademark to be retrieved as a retrieval condition to carry out matching retrieval, and finding out a sample trademark matching the image feature information about the trademark to be retrieved and reaching a predetermined similarity degree, a sample trademark with a highest similarity degree to the image feature information about the trademark to be retrieved, and a corresponding figurative element code;

acquiring and confirming a figurative element code of the trademark to be retrieved;

taking the confirmed figurative element code as a retrieval condition to carry out matching retrieval, and finding out a sample trademark matching the confirmed figurative element code; collecting a result retrieved by taking the image feature information about the trademark to be retrieved as the retrieval condition and a result retrieved by taking the confirmed figurative element code as the retrieval condition; and sequencing collected trademarks according to the similarity degree of the image feature information and reporting a trademark search result.

It will be understood by one of ordinary skill in the art that the specific technical implementations of the device and system for the trademark retrieval in this embodiment are the same as the abovementioned method for the trademark retrieval. All or part of the processes in the abovementioned method can be achieved by relevant hardware instructed by a computer program. The computer program can be stored in a computer readable storage medium. When the computer program is executed, the processes in the abovementioned methods are performed. The storage medium may be a magnetic disk, an optical disc, a read-only memory (ROM), a random access memory (RAM) and so on. Thus, according to the solution of this embodiment, the present disclosure further provides a storage medium containing a computer readable program. When the computer readable program in the storage medium is executed, the method for trademark retrieval of any one of the abovementioned methods is performed.

Although the disclosure herein has been described with reference to various embodiments, it is to be understood that the embodiments are merely illustrative of the principles and applications of the present disclosure. It is therefore to be understood that a number of variations and modifications may be made to the illustrative embodiments without departing from the inventive spirit and scope of the present disclosure. Accordingly, the scope of the present disclosure is defined by the appended claims rather than the foregoing description and the exemplary embodiments described therein.

What is claimed is:

1. A method for trademark retrieval, comprising:
    S101, establishing a sample trademark library and establishing a correlation between sample trademarks and division data for figurative element codes of known pending or registered figurative trademarks;
    S102, extracting and processing image feature information about the sample trademarks, and establishing a correlation between the sample trademarks and the extracted image feature information;
    S103, extracting and processing image feature information about a trademark to be retrieved;
    S104, taking the image feature information about the trademark to be retrieved as a retrieval condition to carry out matching retrieval, and finding out a sample trademark matching the image feature information about the trademark to be retrieved and reaching a pre-determined similarity degree, a sample trademark with a highest similarity degree to the image feature information about the trademark to be retrieved, and a corresponding figurative element code of a trademark;
    S105, acquiring and confirming a figurative element code of the trademark to be retrieved;
    S106, taking the figurative element code confirmed as a retrieval condition to carry out matching retrieval, and finding out a sample trademark matching the confirmed figurative element code;
    S107, collecting a retrieved result acquired by taking the image feature information about the trademark to be retrieved as the retrieval condition and a retrieved result acquired by taking the confirmed figurative element code as the retrieval condition; and
    S108, sequencing collected trademarks according to the similarity degree of the image feature information and reporting a trademark search result,
    wherein the extracting and processing image feature information about the trademarks in S102 and S103 includes:
        performing at least one of preprocessing procedures including graying, binarization and denoising, for a trademark;
        extracting a contour feature line from an image of the preprocessed trademark, wherein the contour feature line includes a set of edge pixels, a set of external contour line pixels and a set of inner contour line pixels of the image of the preprocessed trademark;
        positioning the direction and an extracted square or rectangle for the contour feature line in a coordinate system, wherein the coordinate system is constructed so that each pixel of the figure is defined by measurement units in an X axis and a Y axis;
        extracting a coordinate value $G_n(x_n, y_n)$ of a pixel in the contour feature line in the coordinate system, wherein the subscript n represents a n-th pixel;
        representing the coordinate value $G_n(x_n, y_n)$ with a relative number according to a preset rule, thereby acquiring a relative coordinate value $S_n(x_n, y_n)$, wherein values of $x_n$ and $y_n$ in Sn are represented by relative numbers (percentages), and the $x_n$ and $y_n$ in Gn are represented by absolute numbers;
        rounding the relative coordinate value $S_n(x_n, y_n)$ according to a preset distortion tolerance parameter and a rounding rule of "omitting decimal fractions smaller than 0.5 and counting all others, including 0.5, as 1", to acquire a rounded relative coordinate value $Z_n(x_n, y_n)$;
        establishing a subfigure segment of the image of the trademark; and
        extracting and processing image feature information of the subfigure segment, to acquire a relative coordinate value $S_n(x_n, y_n)$ of the subfigure segment and round the relative coordinate value $S_n(x_n, y_n)$.

2. The method of claim 1, wherein the establishing a correlation between sample trademarks and division data for figurative element codes of known pending or registered figurative trademarks in S101 includes:
    using the division data for the figurative element code of the known pending or registered figurative trademarks to record figurative element codes of the sample trademarks in the sample trademark library.

3. The method of claim 1, wherein the image feature information is key feature information of the image of the trademark, including the coordinate value $G_n(x_n, y_n)$ of the pixel in the extracted contour feature line of the image of the trademark, the relative coordinate value $S_n(x_n, y_n)$ and the rounded relative coordinate value $Z_n(x_n, y_n)$ after the positioning.

4. The method of claim 3, wherein the image feature information further includes framework feature information, shape feature information and/or template feature information extracted by using a known figure key feature information extraction method.

5. The method of claim 1, wherein the taking the image feature information about the trademark to be retrieved as a retrieval condition to carry out matching retrieval in S104 includes at least one of:
    retrieving the rounded relative coordinate value $Z_n(x_n, y_n)$ in the contour feature line of the image of the trademark;
    retrieving each array of continuous pixels in the contour feature line of the image of the trademark, or information about the subfigure segment of the image of the trademark; and
    retrieving the number of unmatched pixels of the rounded relative coordinate value $Z_n(x_n, y_n)$ in the contour feature line of the image of the trademark.

6. The method of claim 1, wherein the confirming a figurative element code of the trademark to be retrieved in S105 includes:
    identifying relevant figure element code reflecting distinctiveness of the trademark and an image reflected by a corresponding main figure of the trademark, a corresponding subfigure segment of the image of the trademark, or one array of continuous pixels, from the acquired sample trademark with the highest similarity degree and corresponding trademark figurative element code, and an image reflected by a corresponding main figure of the trademark, a corresponding subfigure segment of the image of the trademark, or one array of continuous pixels, and performing a confirmation operation.

7. The method of claim 6, wherein the confirming a figurative element code of the trademark to be retrieved in S105 further includes:

adding a trademark subfigure segment by user-defined input or input based on contents listed in an International Classification of the Figurative Elements of Marks, when no sample trademark and recorded figure element code information matching the image reflected by the main figure of the trademark, the subfigure segment of the image of the trademark, or one array of continuous pixels is found in the sample trademark library of the division data for the figurative element codes of known pending or registered figurative trademarks.

8. The method of claim 1, wherein the taking the confirmed figurative element code as a retrieval condition to carry out matching retrieval in S106 includes using an image recognition technology to acquire and confirm figurative element code of the trademark to be retrieved and to carry out matching retrieval.

9. The method of claim 1, wherein the sequencing collected trademarks according to the similarity degree of the image feature information in S108 includes at least one of:

sequencing collected trademarks according to the similarity degree of the image feature information in an image recognition technology; and sequencing collected trademarks according to an similarity rate of an array of continuous pixels or the subfigure segment of the image of the trademark, an overlapping rate of the relative coordinate value of the pixel and/or non-overlapping rate of the relative coordinate value of the pixel recorded in the trademark to be retrieved and the sample trademark.

10. A non-transitory storage medium containing a computer readable program, wherein when the computer readable program in the non-transitory storage medium is executed on a computer, a method for trademark retrieval is performed, the method comprising:

S101, establishing a sample trademark library and establishing a correlation between sample trademarks and division data for figurative element codes of known pending or registered figurative trademarks;

S102, extracting and processing image feature information about the sample trademarks, and establishing a correlation between the sample trademarks and the extracted image feature information;

S103, extracting and processing image feature information about a trademark to be retrieved;

S104, taking the image feature information about the trademark to be retrieved as a retrieval condition to carry out matching retrieval, and finding out a sample trademark matching the image feature information about the trademark to be retrieved and reaching a pre-determined similarity degree, a sample trademark with a highest similarity degree to the image feature information about the trademark to be retrieved, and a corresponding figurative element code of a trademark;

S105, acquiring and confirming a figurative element code of the trademark to be retrieved;

S106, taking the figurative element code confirmed as a retrieval condition to carry out matching retrieval, and finding out a sample trademark matching the confirmed figurative element code;

S107, collecting a retrieved result acquired by taking the image feature information about the trademark to be retrieved as the retrieval condition and a retrieved result acquired by taking the confirmed figurative element code as the retrieval condition; and S108, sequencing collected trademarks according to the similarity degree of the image feature information and reporting a trademark search result, wherein the extracting and processing image feature information about the trademarks in S102 and S103 includes:

performing at least one of preprocessing procedures including graying, binarization and denoising, for a trademark;

extracting a contour feature line from an image of the preprocessed trademark, wherein the contour feature line includes a set of edge pixels, a set of external contour line pixels and a set of inner contour line pixels of the image of the preprocessed trademark;

positioning the direction and an extracted square or rectangle for the contour feature line in a coordinate system, wherein the coordinate system is constructed so that each pixel of the figure is defined by measurement units in an X axis and a Y axis;

extracting a coordinate value $G_n(x_n, y_n)$ of a pixel in the contour feature line in the coordinate system, wherein the subscript n represents a n-th pixel;

representing the coordinate value $G_n(x_n, y_n)$ with a relative number according to a preset rule, thereby acquiring a relative coordinate value $S_n(x_n, y_n)$, wherein values of $x_n$ and $y_n$ in Sn are represented by relative numbers (percentages), and the $x_n$ and $y_n$ in Gn are represented by absolute numbers;

rounding the relative coordinate value $S_n(x_n, y_n)$ according to a preset distortion tolerance parameter and a rounding rule of "omitting decimal fractions smaller than 0.5 and counting all others, including 0.5, as 1", to acquire a rounded relative coordinate value $Z_n(x_n, y_n)$;

establishing a subfigure segment of the image of the trademark; and extracting and processing image feature information of the subfigure segment, to acquire a relative coordinate value $S_n(x_n, y_n)$ of the subfigure segment and round the relative coordinate value $S_n(x_n, y_n)$.

* * * * *